Nov. 20, 1951  R. C. ORTGIES  2,575,359
VERTICAL GAS SCRUBBER
Filed Nov. 23, 1949  2 SHEETS—SHEET 1
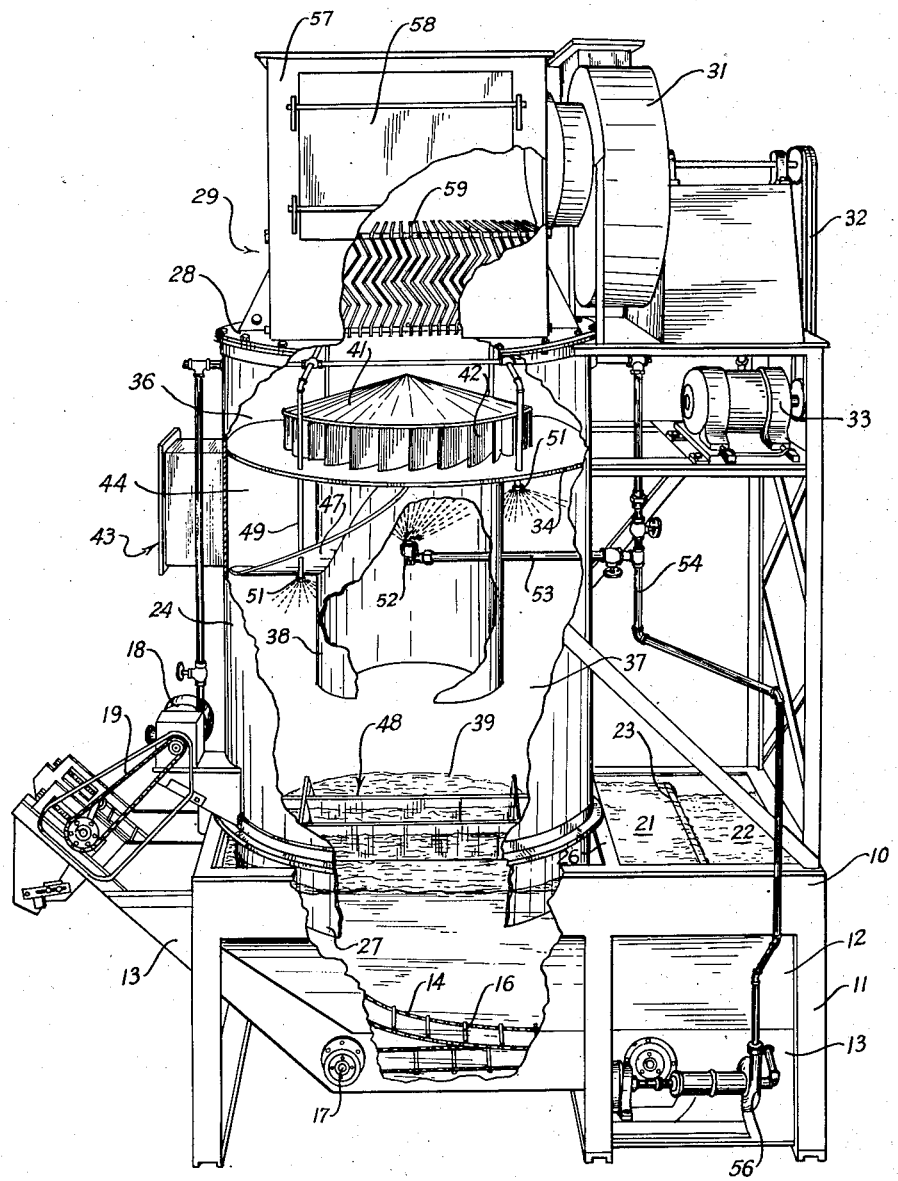
FIG. - 1
INVENTOR.
Raymond C. Ortgies
BY 
ATTORNEY Patented Nov. 20, 1951

2,575,359

UNITED STATES PATENT OFFICE 2,575,359

VERTICAL GAS SCRUBBER

Raymond C. Ortgies, Homewood, Ill., assignor to Whiting Corporation, a corporation of Illinois Application November 23, 1949, Serial No. 129,062

11 Claims. (Cl. 183—21)

My invention relates to gas scrubbers, particularly of the type adapted for the removal of dust and similar particles of relatively high density from a stream of contaminated air.

In certain respects, my device is somewhat similar to that described in Fisher, Patent No. 2,354,675, particularly in that the flow of air through my device is such as to cause wetting of the solid particles carried in the air stream, but the arrangement of various common components is altered and certain additional components included in such manner that the efficiency is increased.

Among the principal objects of my invention is the provision of a gas scrubber of the type adapted to remove solid particles from a stream of air, which is of improved efficiency, particularly with respect to its ability to satisfactorily clean highly contaminated air, which is compact, durable and highly resistant to clogging, and which requires only a minimum of maintenance.

Other objects, which pertain to the various novel parts and combinations thereof, will be disclosed in the course of the following description and in the appended drawings, in which:

Fig. 1 is a partially broken away elevation of my device;

Figure 2:
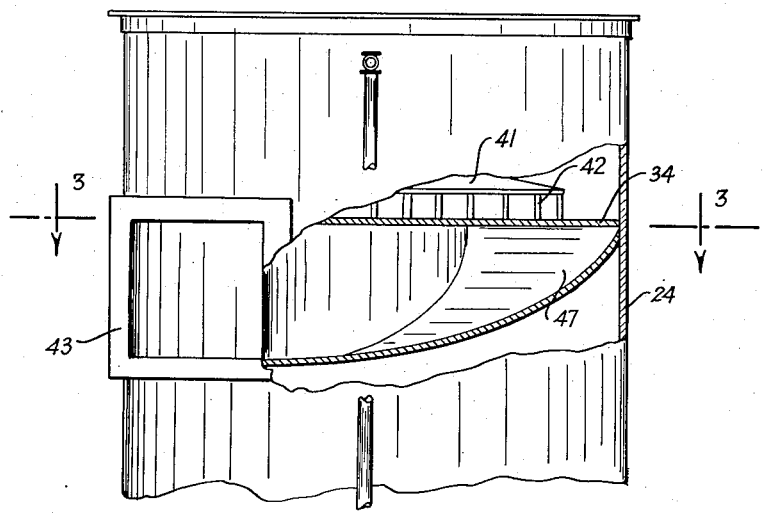
Fig. 2 is a partially broken away enlarged elevation of a portion of my device.
Figure 3:
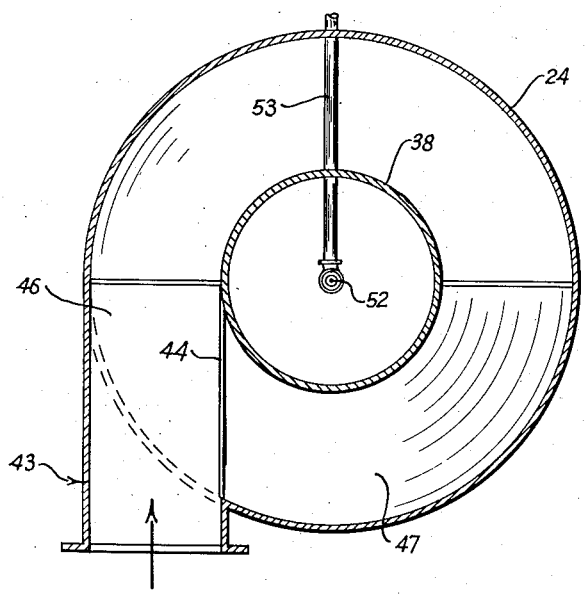
Fig. 3 is a cross section taken along the line 3—3 of Fig. 2.

In brief, my scrubber utilizes an upright cylindrical housing having a tangential inlet for contaminated air near its upper extremity. The lower edge of the housing is sealed by immersion in a body of water retained in a sludge tank in which I incorporate means for settling the collected solids and recirculating clear water through pipes to sprays disposed within the housing. A baffle, located in the housing just above the air inlet, divides the housing into upper and lower compartments and defines an axial opening for a tube, which extends downwardly into the lower compartment. Stationary swirling vanes surmounted by a plate baffle are disposed around the tube outlet and impart a swirling motion to the air entering the second compartment. A suction fan draws air from the second compartment through an outlet in the roof and through a water eliminator, discharging into the room or duct, as desired.

The contaminated air is caused to flow at high velocity in a helical or spiral course through the lower compartment, this flow being promoted by a baffle of spiral configuration extending spirally between the inlet and the diaphragm. Water sprays in the first compartment and in the tube through which the air passes into the second compartment direct the water against the walls of the tube and housing, thus continuously washing these walls and forming a suspension of water droplets in the compartment. The solid particles in the air stream, thrown outwardly by centrifugal force, are wetted by the spray or by impact with the wet walls, where they are collected and continuously washed downwardly into the tank. An anti-swirl grid, extending above the surface of the water in the housing, prevents the formation of a vortex in the water and reduces turbulence in the layer of air lying on the surface of the water, thus promoting proper settling and deposition of the collected solids. The vanes in the upper compartment not only provide additional wet surfaces upon which the particles impinge, but also impart a swirling rotary motion to the air which throws the remaining particles violently outwardly against the compartment walls. In passing the water eliminator, the water droplets remaining in the air are collected and the clean air discharged through the fan.

A preferred embodiment of my invention is shown in the appended drawings and includes a generally rectangular tank supported on a frame 11 and having a sloping bottom 12, which terminates in a trough 13. The trough extends diagonally upwardly from an end of the tank and houses a chain conveyer 14 having transverse flights 16, the conveyer being trained over idler pulleys 17 disposed in such manner as to hold one course of the conveyer close to the bottom of the trough 13. The conveyer 14 is driven by a motor 18 and chain 19 in a conventional manner and is arranged to discharge the collected sludge at a convenient level.

The tank 10 is divided into settling section 21 and a clear water section 22 by a weir 23, which regulates the water level in the settling section 21. An upright cylindrical housing 24 is mounted over the settling section 21 on suitable supports 26 in such manner that the lower edge 27 of the housing 24 projects downwardly into the settling section 21 of the tank 10 below the water level as established by the weir 23. The top of the housing 24 is closed by a cover 28, which defines an outlet communicating with a water eliminator 29, which in turn communicates with the suction side of a fan 13, driven as by belts 32 from a motor 33.

Within the upper portion of the housing 24 is a transverse diaphragm 34, which divides the housing into an upper compartment 36 and a lower compartment 37. An axially disposed tube 38 extends upwardly through the diaphragm 34 from a point within the lower compartment 37 approximately midway between the water level, indicated at 39, and the diaphragm 34. A baffle 41, having a diameter greater than the diameter of the tube 28 is disposed in the upper compartment 36 in spaced relation to the tube outlet and is preferably secured to the upper edges of a plurality of stationary swirling vanes 42, the lower edges of which rest upon the diaphragm 34.

A tangential air inlet duct, generally designated 43, extends into the lower compartment 37 immediately below the diaphragm 34 and into contact with the tube 38. The duct may be built up of a side wall 44 tangential to the wall of the tube 38 and a bottom 46, which preferably terminates on a diameter of the housing normal to the axis of the duct. A baffle 47 extends spirally upward from the bottom 46 of the duct in a direction opposite the direction of air flow, the edges of the baffle being in contact with the housing 24 and tube 38. The upper end of the baffle 47 is secured to the under surface of the diaphragm 34 at a point removed approximately 180° from the mouth of the air inlet duct 43. In some instances the member 44 is not essential and may be eliminated if desired, since the baffle 47 may be integral with the bottom 46 and seal the side of the duct 43.

A grid, generally designated 48, is disposed near the lower portion of the housing 24 at the water level 39, and serves to prevent the formation of a vortex in the water, as well as in the layer of air immediately above the water surface. Preferably this grid is constructed of two pairs of spaced parallel upright strips, each pair being normal to the other defining by intersection a relatively large square or rectangular opening below the tube 38. The ends of the strips are secured to the housing 24 at a predetermined level which partially immerses the strips in the water.

Pipes 49 project downwardly through the diaphragm 34 and baffle 47 to conical or half conical water sprays 51 disposed approximately midway between the tube 38 and the housing 24 and are adapted to continuously discharge water outwardly and downwardly into contact with the walls of the tube 38 and housing 24. An upright conical water spray 52 is mounted on the end of a pipe 53 within the tube 38 on the axis of the tube 38 and housing 24 in such manner as to deliver a cone-shaped spray of water outwardly and upwardly against the inner wall of the tube 38, forming a curtain of high velocity water droplets through which the air stream must pass as it travels through the tube 38. The pipes 49 and 53 are connected to a feed pipe 54, which is supplied with water under pressure from a pump 56, the inlet of said pump communicating with the clear water section 22. The water eliminator 29 may include, for example, a housing 57 having an access door 58 and enclosing a plurality of closely spaced, generally vertical zigzag plates 59, arranged in the path of air flow through the housing 57.

In operation, the tank 10 is filled with water to the desired level, thus sealing the bottom of the housing 24. The fan 31 and pump 56 are placed in operation, causing contaminated air to be drawn into my device through the inlet 46. The sprays 51 and 52 maintain a continuously renewed film of water on the inner surface of the housing 24 and the inner and outer surfaces of the tube 38, as well as creating a suspension of water droplets in the lower compartment 37. Particles of dust or other foreign material carried by the contaminated air drawn into the inlet 46 are wetted in part by impact with the suspended water droplets, and are thrown outwardly by centrifugal force into contact with the wet internal surfaces of the compartment 37, from which they are continuously washed downwardly by the action of the spray 51 into the settling compartment 21 of the tank 10. The baffle 47 intercepts the air stream and forces it downwardly, the greater portion of the air making between one and one-half and two revolutions within the lower compartment 37 before it is drawn upwardly into the tube 38, where it is forced to pass through the water spray from the nozzle 52.

Ordinarily, the swirling motion of the air in the lower compartment 37 would form a vortex in the water, thus disturbing the water in the settling section 21 and preventing deposition of the wetted solids. Since the grid 48 projects into the water, formation of this vortex is prevented, and in addition a relatively quiet zone of air is formed immediately above the water surface, which aids in depositing the solids carried by the air stream.

Air passing upwardly through the spray 52 carries with it a considerable portion of the water from the spray, which serves to maintain the vanes 42 in a thoroughly wetted condition at all times. The vanes 42 are disposed at such an angle that the air drawn through the tube 48 into the upper compartment 36 is given a violent outward swirling motion, which throws the relatively heavy dust and water particles outwardly into contact with the walls of the compartment 36. At this point, substantially all of the dust originally carried by the air will have been brought into contact with a wetted surface and precipitated, but air escaping from the upper compartment 36 still carries with it an appreciable quantity of water. This is eliminated as the air is drawn through the zigzag plates 59 in the water eliminator 29. The plates 57 are spaced in such manner as to define a tortuous path for the air, having numerous abrupt changes in direction, thus forcing the water droplets into contact with the plate surfaces, where they collect and drain downwardly onto the baffle 41 and eventually into the settling portion 21 of the tank. The fan 31 discharges the cleaned air into the room or into a duct section as desired.

The conveyor 14 may be operated either continuously or intermittently as desired and draws the settled sludge from the settling section 21 of the tank 10 upwardly for discharge into a car or other conveyer. Discharge of the sludge draws a certain amount of water from the tank 10, which should be replaced, either continuously or periodically. The amount of water required to maintain the unit in operation is, however, negligible, since the water is continuously clarified and recirculated. If recirculation is not necessary or desirable, fresh water may be fed to the pipe 54, and the clear water section 22 of the tank 10 eliminated.

The foregoing detailed description has been made in compliance with R. S. 4888, and represents a preferred embodiment of my invention. Certain changes in the details disclosed may, however, be made as desired, and I do not therefore limit myself to the exact form of device described, except insofar as defined in the appended claims.

I claim:

1. A gas scrubber comprising a tank having an open top, an upright cylindrical housing having a bottom edge projecting into the tank and a tangential air inlet above the tank; means for maintaining a water level in the tank above the bottom edge of the housing; the cross sectional area of the housing being less than the cross sectional area of the upper portion of the tank; a cover on the housing having an outlet; a diaphragm in the housing above the inlet, dividing the housing into upper and lower compartments; an axial tube in the lower compartment extending upwardly through the diaphragm, the lower edge of the tube being below the inlet and above the water level; a baffle in the upper compartment across the tube outlet for deflecting air flowing in the upper compartment laterally; water sprays in the tube and lower compartment for washing the walls; and means for passing air through the housing.

2. A gas scrubber comprising a tank having an open top, an upright cylindrical housing having its bottom edge projecting downwardly into the tank and a tangential air inlet above the tank, means for maintaining a water level in the tank above the bottom edge of the housing, the cross sectional area of the housing being less than the cross sectional area of the upper portion of the tank, a cover on the housing having an outlet, a diaphragm in the housing above the inlet dividing the housing into upper and lower compartments, an axial tube in the lower compartment extending upwardly through the diaphragm, the lower edge of the tube being below the inlet and above the water level, a baffle in the upper compartment extending across the tube outlet and spaced therefrom for deflecting air passing through the tube laterally towards the wall of the upper compartment, a plurality of vanes interposed between the baffle and the diaphragm in the path of the air stream for imparting a swirling motion to the air, water sprays in the lower compartment, a centrally disposed water spray in the tube for projecting a spray of water upwardly and laterally on to the walls of the tube, and means for drawing air through the device.

3. A gas scrubber comprising a tank having an open top, an upright cylindrical housing having its bottom edge projecting downwardly into the tank and a tangential air inlet above the tank, means for maintaining a water level in the tank above the bottom edge of the housing, the cross sectional area of the housing being less than the cross sectional area of the upper portion of the tank, a cover on the housing having an outlet, a diaphragm in the housing above the inlet dividing the housing into upper and lower compartments, a plurality of spaced transverse upwardly extending strips across the bottom of the housing disposed for only partial immersion in the water, an axial tube in the lower compartment extending upwardly through the diaphragm, the lower edge of the tube being below the inlet and above the water level, a baffle in the upper compartment extending across the tube outlet and spaced therefrom for deflecting air passing through the tube laterally towards the wall of the upper compartment, a plurality of vanes interposed between the baffle and the diaphragm in the path of the air stream for imparting a swirling motion to the air, water sprays in the tube and lower compartment for projecting a spray of water on to the walls of the compartment and tube, and means for drawing air through the device.

4. A gas scrubber comprising a tank having an open top, an upright cylindrical housing having its bottom edge projecting downwardly into the tank and a tangential air inlet above the tank, means for maintaining a water level in the tank above the bottom edge of the housing, a cover on the housing having an outlet, a diaphragm in the housing above the inlet dividing the housing into upper and lower compartments, a grid of transverse intersecting upright strips in the lower compartment positioned near the water level and projecting downwardly into the water, an axial tube in the lower compartment extending upwardly through the diaphragm, the lower edge of the tube being below the inlet and above the water level, a baffle in the upper compartment extending across the tube outlet and spaced therefrom for deflecting air passing through the tube laterally towards the wall of the upper compartment, a plurality of vanes interposed between the baffle and the diaphragm in the path of the air stream for imparting a swirling motion to the air, water sprays in the tube and lower compartment for projecting a spray of water on to the walls of the compartment and tube, and means for drawing air through the device.

5. A gas scrubber comprising a tank having an open top, an upright cylindrical housing having its bottom edge projecting downwardly into the tank and a tangential air inlet above the tank, means for maintaining a water level in the tank above the bottom edge of the housing, a cover on the housing having an outlet, a diaphragm in the housing above the inlet dividing the housing into upper and lower compartments, an anti-swirl grid including two pairs of spaced intersecting transversely disposed upright strips normal to each other and defining a centrally disposed rectangular opening, said grid being fixed with respect to the housing and projecting downwardly from within the lower compartment into the water in the tank, an axial tube in the lower compartment extending upwardly through the diaphragm, the lower edge of the tube being below the inlet and above the water level, a baffle in the upper compartment extending across the tube outlet and spaced therefrom for deflecting air passing through the tube laterally towards the wall of the upper compartment, a plurality of vanes interposed between the baffle and the diaphragm in the path of the air stream for imparting a swirling motion to the air, water sprays in the tube and lower compartment for projecting a spray of water on to the walls of the compartment and tube, and means for drawing air through the device.

6. A gas scrubber comprising a tank, an upright cylindrical housing having a bottom edge projecting into the tank, means for maintaining a water level in the tank above the bottom edge of the housing, a cover on the housing having an outlet, a diaphragm dividing the housing into upper and lower compartments, an axial tube in the lower compartment extending from above the water level upwardly through the diaphragm, a tangential air inlet duct projecting into the housing below the diaphragm and above the tank and including a wall in the path of the incoming air extending spirally downward within the housing in engagement with the wall of said axial tube, a transverse baffle in the upper compartment extending across the outlet of said tube and spaced from the diaphragm for deflecting air laterally, a plurality of swirling vanes disposed between the baffle and the diaphragm in the path of air for imparting a swirling motion thereto, a water spray in the tube and lower compartment for projecting water droplets on to the walls of the tube and housing, and means for drawing air through the housing.

7. A gas scrubber comprising a tank, an upright cylindrical housing having a bottom edge projecting into the tank, means for maintaining a water level in the tank above the bottom edge of the housing, a cover on the housing having an outlet, a diaphragm dividing the housing into upper and lower compartments, an axial tube in the lower compartment extending from above the water level upwardly through the diaphragm, a tangential air inlet duct extending approximately half way into the housing between the tube and the housing, a baffle extending spirally upwardly from the bottom of the duct to the diaphragm in a direction opposite the direction of air flow, a transverse baffle in the upper compartment extending across the outlet of said tube and spaced from the diaphragm for deflecting air laterally, a plurality of swirling vanes disposed between the baffle and the diaphragm in the path of air for imparting a swirling motion thereto, a water spray in the tube and lower compartment for projecting water droplets on to the walls of the tube and housing, and means for drawing air through the housing.

8. A gas scrubber comprising a tank, an upright cylindrical housing having a bottom edge projecting into the tank, means for maintaining a water level in the tank above the bottom edge of the housing, a cover on the housing having an outlet, a diaphragm dividing the housing into upper and lower compartments, an axial tube in the lower compartment extending from above the water level upwardly through the diaphragm a tangential air inlet duct extending into the housing below the diaphragm into contact with the tube, the duct including a bottom member having edges engaging the tube and housing and extending spirally upwardly in a direction opposite the direction of air flow into contact with the diaphragm, a transverse baffle in the upper compartment extending across the outlet of said tube and spaced from the diaphragm for deflecting air laterally, a plurality of swirling vanes disposed between the baffle and the diaphragm in the path of air for imparting a swirling motion thereto, a water spray in the tube and lower compartment for projecting water droplets on to the walls of the tube and housing, and means for drawing air through the housing.

9. A gas scrubber comprising a tank, an upright cylindrical housing having a bottom edge projecting into the tank, means for maintaining a water level in the tank above the bottom edge of the housing, a cover on the housing having an outlet, a diaphragm dividing the housing into upper and lower compartments, a fixed grid of intersecting upright strips fixed with respect to the housing in the lower compartment and projecting downwardly from within the lower compartment to a point below water level, an axial tube in the lower compartment extending from above the water level upwardly through the diaphragm, a tangential air inlet duct extending into the housing below the diaphragm into contact with the tube, the duct including a bottom member having edges engaging the tube and housing and extending spirally upwardly in a direction opposite the direction of air flow into contact with the diaphragm, a transverse baffle in the upper compartment extending across the outlet of said tube and spaced from the diaphragm for deflecting air laterally, a plurality of swirling vanes disposed between the baffle and the diaphragm in the path of air for imparting a swirling motion thereto, water sprays in the tube and lower compartment for projecting water droplets onto the walls of the tube and housing, and means for drawing air through the housing.

10. A gas scrubber comprising a tank having an open top and a transverse weir dividing the tank into a settling section and a clear water section, an upright cylindrical housing having a bottom edge below the level of the weir and in said settling section, means for maintaining a water level in the tank above the bottom edge of the housing, a cover on the housing having an outlet, a diaphragm dividing the housing into upper and lower compartments, a fixed grid of transverse intersecting upright strips fixed with respect to the housing in the lower compartment and projecting downwardly from within the lower compartment to a point below water level, an axial tube in the lower compartment extending from above the water level upwardly through the diaphragm, a tangential air inlet duct extending into the housing below the diaphragm into contact with the tube, the duct including a bottom member having edges engaging the tube and housing and extending spirally upwardly in a direction opposite the direction of air flow into contact with the diaphragm, a transverse baffle in the upper compartment extending across the outlet of said tube and spaced from the diaphragm for deflecting air laterally, a plurality of swirling vanes disposed between the baffle and the diaphragm in the path of air for imparting a swirling motion thereto, downwardly directed water sprays in the lower compartment for projecting water laterally against the housing and outer wall of the tube, an upwardly directed axially disposed conical water spray in the tube for projecting a conical curtain of water outwardly into contact with the inner walls of the tube, and means for drawing air through the housing.

11. A gas scrubber comprising a tank having a transverse weir dividing the tank into a settling section and a clear water section, an upright cylindrical housing having a bottom edge below the level of the weir and in said settling section, means for maintaining a water level in the settling section above the bottom edge of the housing, a cover on the housing having an outlet, a diaphragm dividing the housing into upper and lower compartments, a fixed grid of intersecting upright strips fixed with respect to the housing in the lower compartment and projecting downwardly from within the lower compartment to a point below water level, an axial tube in the lower compartment extending from above the water level upwardly through the diaphragm, a tangential air inlet duct extending into the housing below the diaphragm into contact with the tube, the duct including a bottom member having edges engaging the tube and housing and extending spirally upwardly in a direction opposite the direction of air flow into contact with the diaphragm, a transverse baffle in the upper compartment extending across the outlet of said tube and spaced from the diaphragm for deflecting air laterally, a plurality of swirling vanes disposed between the baffle and the diaphragm in the path of air for imparting a swirling motion thereto, downwardly directed water sprays in the lower compartment positioned therein for projecting water laterally against the housing and outer wall of the tube, an upwardly directed tangentially disposed conical water spray in the tube for projecting a conical curtain of water outwardly into contact with the inner wall of the tube, pump means for forcing water from the clear water section of the tank to the sprays, and means for drawing air through the housing.

RAYMOND C. ORTGIES.

REFERENCES CITED

The following references are of record in the file of this patent:

UNITED STATES PATENTS

| Number | Name | Date |
|---|---|---|
| 1,264,263 | Brassert | Apr. 30, 1918 |
| 2,354,675 | Fisher | Aug. 1, 1944 |
| 2,380,065 | Newcomb | July 10, 1945 |
| 2,484,277 | Fisher | Oct. 11, 1949 |
| 2,496,281 | Fisher | Feb. 7, 1950 |